United States Patent [19]

Burkwall, Jr.

[11] 4,044,158

[45] Aug. 23, 1977

[54] CASEINATE REPLACEMENT FOR PET FOOD USING A NEUTRAL CHELATING AGENT

[75] Inventor: Morris P. Burkwall, Jr., Marengo, Ill.

[73] Assignee: The Quaker Oats Company, Chicago, Ill.

[21] Appl. No.: 706,536

[22] Filed: July 19, 1976

Related U.S. Application Data

[63] Continuation-in-part of Ser. No. 598,415, July 23, 1975, abandoned.

[51] Int. Cl.$^2$ .......................... A23K 1/18; A23K 1/10; A23K 1/14
[52] U.S. Cl. .................................... 426/271; 426/331; 426/630; 426/805
[58] Field of Search ............... 426/805, 271, 321, 331, 426/264, 265, 266, 630

[56] References Cited

U.S. PATENT DOCUMENTS

| 3,653,908 | 4/1972 | Buck et al. | 426/332 |
|---|---|---|---|
| 3,769,034 | 10/1973 | Dreirer, Jr. et al. | 426/271 |
| 3,830,798 | 8/1974 | Herndon | 426/805 |

Primary Examiner—Jeanette M. Hunter
Attorney, Agent, or Firm—Mathew R. P. Perrone, Jr.

[57] ABSTRACT

A substantially neutral chelating agent combines with a vegetable protein and an amylaceous material to form a suitable composition which at least partially replaces a casein salt in a semi-moist pet food.

11 Claims, No Drawings

CASEINATE REPLACEMENT FOR PET FOOD USING A NEUTRAL CHELATING AGENT

CROSS REFERENCE TO RELATED APPLICATION

This is a continuation-In-Part Application of U.S. Ser. No. 598,415, filed July 23, 1975, now abandoned.

BACKGROUND OF THE INVENTION

This invention relates to a semi-moist pet food and more particularly to a semi-moist pet food utilizing a vegetable protein, starch or flour, and at least one substantially neutral chelating agent in combination to replace at least part of the casein salt component of the semi-moist pet food.

Within the class of foods known as pet foods, there are three basic subdivision: (1) dry pet food containing low moistures; (2) semi-moist pet food containing medium moistures; and (3) moist pet foods containing high moistures. The moisture content is determined by considering both the water present in the final product and the water combined with the various components that make up the final product. In general, the dry pet food tends to be the most stable and requires to special handling or packaging upon distribution. The semi-moist pet food tends to be less stable than the dry pet food and requires a more careful packaging system. However, the semi-moist pet food requires no refrigerated storage, and tends to be microbiologically and bacteriologically stable due to the presence of various stabilizing agents. The moist pet food requires stringent canning conditions. In fact, the moist pet food is canned and sterilized by retorting in the usual manner. When the can is opened, the pet food not consumed must be refrigerated to preserve it. Thus, it may be seen that — after a pet food is opened and partially used — the dry pet food is the most stable pet food; the semi-moist of medium stability and the moist of lowest stability. When considering palatability, generally speaking the moist pet food tends to be the most palatable and the dry pet food tends to be the least palatable. The semi-moist pet food falls somewhere in between the moist and the dry pet food as to palatability. It follows that both as to palatability and stability the semi-moist pet food ranks in between the dry and the moist pet food. This ranking permits the semi-moist pet food to provide both shelf stability and palatability. In other words, a pet owner using a semi-moist pet food has fewer problems storing a pet food which his pet will eat.

The advantages of a semi-moist pet food thus become obvious. In semi-moist pet foods and other processed foods, casein derivatives such as sodium caseinate provide a highly suitable material. This material can be classified as a thermoplastic protein, is a good moisture and meat binder, and can be the basis of a good extrudable material. Furthermore, this material has such a high protein content, that it is used as a standard for determining or measuring protein quality of other protein-containing materials. So, in addition to the processing advantages of using caseinate, there is also a nutritional advantage due to the protein provided thereby. It thus becomes obvious why this material is so widely used in the food processing art and especially in the pet food art. However, the pricing of casein derivatives such as soidum caseinate are very high due to the economic conditions associated with milk processing. This price is so high, that it is economically unfeasible to use the amounts of caseinate in pet foods that are currently being used or desired. It follows that it is desirable to develop a replacement for at least some of the casein in order to bring down final product cost.

The unique qualities of casein salts — such as for example sodium, calcium, magnesium, ammonium, and potassium caseinate — render them difficult to replace. Not only must the replacement provide protein and processability, the appearance and flavor of the product must be substantially maintained. For example, it is customary to extrude semi-moist pet foods. Specifically, semi-moist pet foods containing caseinate derivatives are easily extrudable. It follows that the replacement for this component should also provide easy extrudability for the product in order to avoid substantial changes in machinery and manufacturing equipment. The protein level of the replacement must remain high and the palatability of the product containing the replacement must remain substantially the same.

Replacing a part of a casein derivative, such as sodium caseinate, creates further problems. Dilutions of the sodium caseinate concentration in a pet food tend to reduce the overall effect of the sodium caseinate. As the concentration of sodium caseinate is decreased and replaced by another component, the solubility, thermal properties, and elastic and structure forming properties contributed by caseinates to the dough are reduced. Thus, even partial replacement of sodium caseinate causes problems due to the fact that the effect of the remaining sodium caseinate is reduced.

Thus it may be seen that while costs have made casein derivatives an unacceptable component of a pet food, it is nevertheless difficult to replace a product component providing so many advantages.

SUMMARY OF THE INVENTION

Therefore, it is an object of this invention to provide an improved pet food of the semi-moist category.

It is a further object of this invention to provide a palatable, semi-moist pet food.

It is a still further object of this invention to provide a stable semi-moist pet food.

Yet a further object of this invention is to provide a semi-moist pet food containing an effective binder system.

Also an object of this invention is to provide a semi-moist pet food containing an extrudable binder.

Another object of this invention is to provide a semi-moist pet food having a high protein content.

Still another object of this invention is to provide a semi-moist pet food product having a low cost binder.

A further object of this invention is to provide a semi-moist pet food having good processability.

Yet a further object of this invention is to provide a semi-moist pet food having at least part of the casein derivative replaced without minimizing the effect of the remaining casein derivative.

These and other objects of this invention are met by providing a semi-moist pet food having at least partial replacement of a caseinate binder in the semi-moist pet food with a combination of at least one vegetable protein, at least one amylaceous material, and at least one substantially neutral chelating agent.

DESCRIPTION OF THE PREFERRED EMBODIMENTS

A semi-moist pet food is manufactured by including in the process a vegetable protein, an amylaceous material, and a substantially neutral chelating agent to form a composition which replaces at least in part the caseinate binder customarily present in a semi-moist pet food.

A highly successful semi-moist pet food is disclosed in U.S. Pat. No. 3,380,832 to Bone and U.S. Pat. No. 3,765,902 to Charter incorporated herein by reference. These patents produce a solid, semi-moist, marbled meat pet food. The product produced by the method disclosed therein is highly acceptable as a pet food. The above-mentioned patents are incorporated herein by reference because the method and product disclosed therein are substantially the same as the method and product disclosed in this application. The major improvement of this application over the cited patents is the replacement of the caseinate binder in whole or in part with a combination of vegetable protein, amylaceous ingredient, and a substantially neutral chelating agent. The vegetable protein, the amylaceous ingredient and substantially neutral chelator combine to make a less expensive binder system which approaches the acceptability of the product using the casein derivative binder.

Vegetable protein is added to the pet food in an amount ranging from about 1 percent to about 26 percent by weight of the pet food to replace the protein content lost by removal of the caseinate salt. These vegetable proteins replace the casein derivatives up to and including 100 percent by weight of the casein derivative. It is especially preferred that the vegetable protein used replaces the caseinate salt to give substantially the same amount of protein from both a quality and quantity standpoint. This vegetable protein is combined with the amylaceous system and a chelator to provide a means for replacing all functions of the caseinate in the food. Since caseinate is a high quality protein, it may require more vegetable protein to obtain the same nutritional quality depending on the quality of vegetable protein used. In view of the teachings herein, such adjustments are obvious to one of ordinary skill in the art.

Vegetable proteins suitable for use in this invention include an oil seed portein, and mixtures thereof. Typical oil seeds include soybean, cottonseed, and peanut. The oil seeds are usable in their meal, concentrate, isolate, or flour form, or mixtures thereof. The oil seed portein may also be modified by acid, or enxymatic hydrolysis. The preferred vegetable protein for use in this pet food is soy protein isolate (approximately 90 percent protein) or soy protein concentrate (approximately 70 percent protein).

Amylaceous components, such as starch or starch containing components exemplified by the cereal grains, are also critical components of this invention. Such suitable components are listed in U.S. Pat. No. 3,962,462 to Burkwall et al. Regular corn starch, pregelatinized wheat flour, amylopectin corn starch, acid hydrolyzed corn starch, and mixtures thereof are especially suitable to combine with the vegetable protein and the neutralized acidic chelating agent to replace the caseinate salt and its function.

About 4 to about 25 percent by weight of the final product is generally comprised of a starch or mixture of starches. More preferably, the starch or mixture thereof is from about 6 to 20 percent by weight of the final product. Most preferably, the desired concentration of the starch or mixtures thereof is from about 8 percent to about 15 percent by weight of the final product. Most preferably, the desired concentration of the starch or mixtures thereof is from about 8 percent to about 15 percent by weight of the final product.

Generally speaking, a substantially neutral pH is required for caseinate salts to function properly during extrusion. the isoelectric point of a caseinate protein is around 4.6. As this point is approached, the caseinate becomes less and less functional even to the point of becoming an insoluble non-functional curd called casein which does not have the desirable properties for use in a semi-moist pet food. This feature is also required for the caseinate replacement of this invention. Specifically, the caseinate replacement for this invention operates in a substantially neutral pH. By "substantially neutral" is meant that the pH range for the pet food covers the field of about 6.1 to 8.0. More preferably, the pH range is 6.2 to 7.5. Substantially improved results are obtained which lead to the conclusion that the most preferred range is 6.3 to 7.2.

Suitable chelating agents for use herein are listed in the *Handbook of Food Additives* published by CRC Press, Cleveland, Ohio, copyright 1972 (Library of Congress Catalog Card Number 68-21741).

For the purposes of this application, a substantially neutral chelating agent is defined as a chelator that is not acidic in nature. Acidic chelating agents are discussed in copending U.S. patent application Ser. No. 706,534 of Burkwall filed concurrently herewith as a continuation-in-part of U.S. Ser. No. 598,415 filed July 23, 1975.

Desirable neutral chelating agents are the non-acid chelators that are food approved or otherwise edible. By non-acid, is also meant those chelators which will not alter the pH of the final food composition sufficiently to take it outside the desired pH ranges. While the desired pH range is usually obtained in the pet food, adjustment of the pH is possible by using an edible acid or base. The edible acid may even by used to adjust the pH, if the pH is too basic due to a chelator salt which is basic in nature, and still achieves the objectives of the invention. Typical chelators of this class include materials such as the citrates, ethylenediaminetetraacetates, metaphosphates, polyphosphates, and pyrophosphates. Typical citric acid salts for use in this invention include the sodium, the potassium, the calcium, the monoglyceride, the mono isopropyl, the stearyl, and the triethyl salts of citric acid. the ethylenediaminetetraacetate salts are further examples of non acid chelating agents. Especially preferred salts are sodium pyrophosphate, sodium hexametaphosphate, sodium tripolyphosphate, disodium calcium ethylenediaminetetraacetate, and disodium dihydrogen ethylenediaminetetraacetate. These salts must be edible in order to be suitable for use in foods.

Generally speaking, at least 0.01 percent by weight of the pet food is chelating agent. More preferably, the chelating agent comprises about 0.01 percent to about 5 percent by weight of the pet food. More preferably, the sodium caseinate replacement comprises about 0.1 to about 4 percent by weight. The best results are obtained with about 0.2 to about 2 percent by weight chelating agent in the pet food.

A major constituent of the animal food is meat or meat by-products. By "meat" is meant the flesh of cattle, swine, sheep, goats, horses, whale, and other mammals, poultry and fish. The term "meat by-products" includes such constituents as are embraced by that term in the Definition of Feed Ingredients published by the Association of American Feed Control Officials Inc.

The aminal food of this invention comprises about 5 percent to about 50 percent by weight meat by-products or meat. Hereafter, the term meat includes both meat, meat by-products and meat meals. Various types of meat can be mixed to form the meat portion of this animal food. Various mixtures of meat adjust the flavor of the animal food. An acceptable range of meat for this animal food includes 15 percent to 40 percent. The preferred range of meat for this product is from about 20 percent to about 35 percent by weight of the total product. This concentration of meat is the concentration that provides the most effective use of meat for palatability and nutrition while at the same time being the most cost effective. The preferred meat by-products are light in color and include beef tripe, beef intestines, partially defatted pork tissue, other light colored by-products and mixtures thereof.

The moisture content of this product is about 15 percent to about 50 percent by weight, or more preferably 20 percent to 40 percent. Above about 50 percent by weight the product is too sloppy and soupy to be formed into the desired shape. The moisture is provided in any suitable fashion — either by components of the product or water in any combination. For example, the meat or meat by-products contain a substantial amount of moisture and can provide a portion or all of the moisture suitable when used in the product. The meat meals obviously provide only a small portion of the moisture. Water can also be used to provide the moisture content of the product in whole or in part.

Sugar is also an important component of this particular pet food. By "sugar" is meant any edible sugar used in the food art. Substantial examples of suitable sugars for use in the food art are listed in U.S. Pat. No. 3,202,514 to Burgess, et al. — incorporated herein by reference. Corn syrup is also an effective sugar. A suitable amount of sugar for use in this product ranges from about 5 percent by weight to about 35 percent by weight of the final product. The preferred range of sugar for use in the composition ranges from 10 percent to 25 percent by weight of the final product. While the broader ranges are operable for the purpose of this invention, the preferred range appears to be the most cost effective and provides adequate palatability.

The stabilizer for the semi-moist pet food of this invention comprises at least one polyhydric component, at least one antimycotic, and at least one sugar. The sugar is as above defined. the antimycotic is present in an amount effective to stabilize the pet food in combination with the other stabilizer components. The antimycotic is an edible antimicrobial acid salt present in an amount of 0.01 to 1 percent, more preferably from 0.015 to 0.5 percent. Typical edible acid salts include benzoates, parabens, propionates, acetates, and sorbates. Especially preferred is potassium sorbate. A typical polyhydric component or mixtures thereof are disclosed in U.S. Pat. No. 3,741,774 to Burkwall — incorporated herein by reference. Also included in the polyhydric components are propylene glycol, and 1,3-butanediol both of which are preferred either individually or in combination for the product of this invention. The polyhydric component is generally present in an effective amount to stabilize the pet food or more preferably at about 1 to 20 percent by weight or as specified in the cited semi-moist patents.

Various other common additives from 0 percent to about 25 percent may also be added to the pet food. Fat is usually added in an amount from 0 percent to 12 percent by weight of the final product depending upon how much is naturally contained in the meat. The fat may be of either animal or vegetable fat. A preferred fat for use in this pet food is an animal fat exemplified by prime steam lard, tallow, and choice white grease. Dicalcium phosphate and other minerals are incorporated in the pet food along with natural and synthetic vitamins for the purpose of making the product nutritious to the pet. Vitamins, minerals, colorings, and flavors are generally present in the pet food also in the amount of about 0 percent to about 8 percent for the purpose of nutrition and overall appearance.

A suitable process for preparing the pet food of this invention is described in the above-referenced patents to Bone and Charter. Basically, the meat is ground and emulsified. Separately the dry ingredients are blended. To the dry ingredients is added the required fat. Then, the meat, water and propylene glycol and sorbate is added to the dry ingredients in the fat. After mixing, a dough is formed. The dough is then extruded in a standard fashion. During extrusion, the dough is heated to about 220° F. to 260° F. in order to form a molten, flowable product. For marbled meat products, two separate doughs are formed and extruded as described in the above-referenced patent to Charter.

By following the Charter process, the extrudate is cooled on both sides. After the extrudate is cooled it is appropriately treated for packaging. For example, the extrudate is cut into slabs and diced if desired.

In the following examples which are intended to illustrate without unduly limiting the invention, all parts and percentages are by weight unless otherwise specified.

EXAMPLE 1

The following table lists three different formulations. Formulation A is control using all sodium caseinate as the protein source. Formula B replaces approximately one-half of the sodium caseinate with soy protein isolate, an appropriate starch system, and a chelating agent. Formula C replaces all of the sodium caseinate with soy protein isolate, an appropriate starch system, and a chelating agent.

| Ingredient | Formula A | Formula B | Formula C |
|---|---|---|---|
| Beef Tripe | 30.0 | 30.0 | 30.0 |
| Sugar | 25.0 | 25.0 | 25.0 |
| Sodium Caseinate | 12.5 | 6.5 | — |
| Soy Protein Isolate | — | 6.0 | 12.5 |
| Corn Starch | 8.0 | 6.0 | 4.0 |
| High Amylose Corn Starch | — | 2.0 | 4.0 |
| Amylopectin Starch | — | 2.0 | 2.0 |
| Propylene Glycol | 5.0 | 5.0 | 5.0 |
| Potassium Sorbate | 0.1 | 0.1 | 0.1 |
| Animal Fat | 4.0 | 4.0 | 4.0 |
| Vitamins, Minerals, Coloring, Salts, Antioxidants, and other additives | 8.0 | 8.0 | 8.0 |
| Tetra-Sodium Pyrophosphate | — | 0.4 | 0.4 |
| Water | 7.4 | 5.0 | 5.0 |
|  | 100.00 | 100.00 | 100.00 |

Each of these examples uses red color and is processed as in the Charter patent above-referenced except that they are not marbled with a white portion. Product B and C are equivalent to Product A in dough consistency, extruder processability, and final product texture and appearance. Products A, B, and C typically have a pH in the range of 6.5 to 7.5.

Having now fully disclosed the invention, what is claimed and desired to be secured by Letters Patent of the United States is:

1. In a marbled, semi-moist pet food comprising:
   about 5 percent to about 50 percent by weight meat or meat by-products;
   about 15 to about 50 percent by weight moisture content;
   about 5 percent to about 35 percent by weight sugar;
   up to about 1 percent by weight of an antimycotic;
   about 1 to bout 20 percent by weight polyhydric component;
   and casein salt, the improvement comprising
   replacing at least part of the casein salt with about 1 to about 26 percent by weight vegetable protein; about 4 to about 25 percent by weight starch; and at least 0.01 percent by weight of at least one edible substantially neutral chelating agent — wherein the pH of the pet food is 6.3 to 7.2

2. The semi-moist pet food of claim 1 wherein the chelating agent comprises 0.01 percent to 5 percent.

3. The semi-moist pet food of claim 2 wherein the chelating agent comprises 0.1 percent to 4 percent.

4. The semi-moist pet food of claim 3 wherein the chelating agent comprises 0.2 percent to 2 percent.

5. The semi-moist pet food of claim 4 wherein the chelating agent is at least one selected from the group consisting of a citrate, an ethylenediaminetetraacetate, a metaphosphate, a polyphosphate, and a pyrophosphate.

6. The pet food of claim 5 wherein the chelating agent is tetra-sodium pyrophosphate.

7. The pet food of claim 5 wherein the chelating agent is at least one selected from the group consisting of disodium calcium, ethylenediaminetetraacetate, sodium pyrophosphate, disodiumdihydrogen ethylenediaminetetraacetate, sodium hexametaphosphate, and sodium tripolyphosphate.

8. The semi-moist pet food of claim 5 wherein the starch comprises 8 percent to 15 percent by weight of the pet food and is at least one selected from the group consisting of regular corn starch, pregelatinized wheat flour, amylopectin corn starch, and acid hydrolyzed corn starch.

9. The semi-moist pet food of claim 8 wherein the vegetable protein comprises about 1 to about 26 percent by weight and is at least one selected from the group consisting of soybean, cottonseed, and peanut; and wherein the oil seeds are used in at least one form selected from the group consisting of meal, concentrate, isolate, and flour.

10. The semi-moist pet food of claim 9 wherein the vegetable protein is soy protein isolate and soy protein concentrate.

11. A semi-moist pet food comprising:
   about 5 percent to about 50 percent by weight meat or meat by-products;
   about 15 to about 50 percent by weight moisture content;
   about 5 percent to about 35 percent by weight sugar;
   up to about 1 percent by weight of an antimycotic;
   about 1 to about 20 percent by weight polyhydric component;
   about 1 to about 26 percent by weight vegetable protein;
   about 8 to about 15 percent by weight starch; and
   about 0.2 to about 2 percent by weight substantially neutral chelating agent — wherein the pH of the pet food is 6.3 to 7.2

* * * * *